United States Patent
Shan et al.

(10) Patent No.: US 11,240,640 B2
(45) Date of Patent: Feb. 1, 2022

(54) MULTICAST BEARER MANAGEMENT METHOD AND TERMINAL DEVICE

(71) Applicant: HUAWEI TECHNOLOGIES CO., LTD., Guangdong (CN)

(72) Inventors: Baokun Shan, Beijing (CN); Yinghui Yu, Beijing (CN); Odile Rollinger, Cambridge (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 92 days.

(21) Appl. No.: 16/672,285

(22) Filed: Nov. 1, 2019

(65) Prior Publication Data
US 2020/0068359 A1 Feb. 27, 2020

Related U.S. Application Data

(63) Continuation of application No. PCT/CN2017/083323, filed on May 5, 2017.

(51) Int. Cl.
*H04W 4/08* (2009.01)
*H04W 76/30* (2018.01)
(Continued)

(52) U.S. Cl.
CPC ............. *H04W 4/08* (2013.01); *H04W 76/27* (2018.02); *H04W 76/30* (2018.02); *H04W 80/02* (2013.01)

(58) Field of Classification Search
CPC ....... H04W 4/08; H04W 76/30; H04W 76/27; H04W 80/02; H04W 72/121; H04W 72/005; H04W 4/06
See application file for complete search history.

(56) References Cited

U.S. PATENT DOCUMENTS

2009/0124196 A1* 5/2009 Moon .................. H04L 12/189
455/3.06
2016/0192327 A1 6/2016 Yi et al.
(Continued)

FOREIGN PATENT DOCUMENTS

CN 102724636 A * 10/2012 .......... H04L 12/189
CN 102724636 A 10/2012
(Continued)

OTHER PUBLICATIONS

One2many,"Pseudo-CR on solution 11-1, bearer resumption",3GPP TR 23.780 v1.1.0,3GPP TSG-SA WG6 Meeting #14 Reno, Nevada, USA, Nov. 14-18, 2016,S6-161622,total 2pages.
(Continued)

*Primary Examiner* — Margaret G Mastrodonato
(74) *Attorney, Agent, or Firm* — Womble Bond Dickinson (US) LLP

(57) ABSTRACT

A multicast bearer management method includes: in a process of receiving service data of a single cell-multimedia broadcast multicast service traffic channel SC-MTCH, suspending a single cell-multimedia broadcast multicast service point to multipoint radio bearer SC-MRB corresponding to the SC-MTCH when there is a first type of data to be received; and when reception of the first type of data is completed, restoring or releasing the SC-MRB based on a temporary mobile group identity TMGI and/or a session identity corresponding to the SC-MRB. The technical solutions in the embodiments of the present invention can prevent frequent release and establishment of SC-MRBs, thereby saving network resources and power of a terminal device.

18 Claims, 6 Drawing Sheets

(51) Int. Cl.
*H04W 76/27* (2018.01)
*H04W 80/02* (2009.01)

(56) References Cited

U.S. PATENT DOCUMENTS

| | | | |
|---|---|---|---|
| 2016/0316453 A1 | 10/2016 | Huang et al. | |
| 2017/0339531 A1 | 11/2017 | Kim et al. | |
| 2018/0288576 A1 | 10/2018 | Xu et al. | |
| 2019/0190662 A1* | 6/2019 | Lee | H04L 61/2069 |
| 2019/0261140 A1* | 8/2019 | Fujishiro | H04W 76/27 |
| 2020/0187170 A1* | 6/2020 | Shin | H04W 4/70 |

FOREIGN PATENT DOCUMENTS

| | | |
|---|---|---|
| CN | 102932743 A | 2/2013 |
| CN | 104349303 A | 2/2015 |
| CN | 105635984 A | 6/2016 |
| CN | 106454759 A | 2/2017 |
| CN | 106470498 A | 3/2017 |
| EP | 1909411 A1 | 4/2008 |
| EP | 3217691 A1 | 9/2017 |
| JP | 2007511940 A | 5/2007 |
| JP | 2014522192 A | 8/2014 |
| RU | 2600535 C2 | 10/2016 |
| RU | 2601433 C2 | 11/2016 |
| WO | 2016070572 A1 | 5/2016 |
| WO | 2016072792 A1 | 5/2016 |
| WO | 2016108377 A1 | 7/2016 |

OTHER PUBLICATIONS

Kyocera,"SC-MCCH change notifications and SC-MTCH suspension/resumption",3GPP TSG-RAN WG2 #97 Athens, Greece, Feb. 13-17, 2017,R2-1701672, total 10 pages.

Huawei, HiSilicon, Neul Limited.,"Remaining Issues on SC-PTM Reception",3GPP TSG-RAN WG2 Meeting #98 Hangzhou, China, May 15-19, 2017,R2-1705288,total 3pages.

Ericsson.,"Introduction of SC-PTM for feMTC and NB-IoT enhancements",3GPP TSG-RAN WG2 Meeting #97 Athens, Greece, Feb. 13-17, 2017,R2-1701109, total 44pages.

* cited by examiner

MULTICAST BEARER MANAGEMENT METHOD AND TERMINAL DEVICE

CROSS-REFERENCE TO RELATED APPLICATIONS

This application is a continuation of International Application No. PCT/CN2017/083323, filed on May 5, 2017, the disclosure of which is herein incorporated by reference in its entirety.

TECHNICAL FIELD

Embodiments of the present invention relate to the field of multimedia broadcast multicast, and in particular, to a multicast bearer management method and a terminal device.

BACKGROUND

A multimedia broadcast multicast service (MBMS) is a service introduced by a 3rd generation partnership project (3GPP) to fully use mobile communications network resources. In a mobile communications network, the MBMS provides a point-to-multipoint service that a data source sends data to a plurality of users, thereby implementing network resource sharing and improving resource utilization. The MBMS can directly broadcast multimedia video information to all users, or send multimedia video information to a group of charged subscribers, providing a technical implementation means for a terminal television service.

A narrow bandwidth-internet of things (NB-IoT) is an important branch of an internet of things, and is a technology that uses a narrow bandwidth technology to carry IoT services. The NB-IoT supports cellular data connections of low-power devices in a wide area network. Compared with a service and a terminal device in a traditional cellular network, those of the NB-IoT have the following characteristics: (1) A service in the NB-IoT has a low rate and a relatively long cycle, and compared with the service in the traditional cellular network, the IoT service produces a smaller packet and is insensitive to a time delay. (2) One NB-IoT base station is connected to a large quantity of terminal devices. (3) The terminal device in the NB-IoT has lower costs and complexity than that in the traditional cellular network. (4) The terminal device in the NB-IoT consumes less power.

To meet requirements of low costs and low complexity for the terminal device, usually, the terminal device in the NB-IoT cannot receive data on a plurality of types of channels. If an NB-IoT multicast transmission scheme is designed based on a single cell-point to multipoint (SC-PTM) mechanism in long term evolution (LTE), the following scenario appears: The terminal device in the NB-IoT cannot receive both control information on a single cell-MBMS control channel (SC-MCCH) and service data on a single cell-MBMS traffic channel (SC-MTCH). When the terminal device is receiving the service data on the SC-MTCH, if the control information in the SC-MCCH needs to be received currently, a single cell-MBMS point to multipoint radio bearer (SC-MRB) corresponding to the SC-MTCH needs to be released, and after the control information on the SC-MCCH is received, the SC-MRB needs to be reestablished. This causes the following problems: When a radio link control (RLC) entity corresponding to the SC-MRB is released, a radio link control protocol data unit (RLC PDU) that has been successfully received but not packaged is deleted, and after the SC-MRB is reestablished, the RLC PDU needs to be received again, consuming more power. When reception of a multicast service is not completed, a higher layer may be triggered to apply to a network for a unicast retransmission, but frequent unicast retransmissions also consume more power and network resources.

SUMMARY

To resolve the foregoing problems, embodiments of the present invention provide a multicast bearer management method and a terminal device, to save network resources and power of the terminal device.

According to a first aspect, an embodiment of the present invention provides a multicast bearer management method, including:

in a process of receiving service data of a single cell-multimedia broadcast multicast service traffic channel SC-MTCH, suspending a single cell-multimedia broadcast multicast service point to multipoint radio bearer SC-MRB corresponding to the SC-MTCH when there is a first type of data to be received; and when reception of the first type of data is completed, restoring or releasing the SC-MRB based on a temporary mobile group identity TMGI and/or a session identity corresponding to the SC-MRB.

The suspending refers to performing another task without temporary closing or release, and continuing to use the SC-MRB after the another task is performed, and may be equivalent to an operation such as freezing, mothballing, or making dormant.

Correspondingly, the restoring is equivalent to an operation such as unfreezing, unmothballing, or awakening.

In this embodiment of the present invention, if the first type of data needs to be received in the process of receiving the service data of the SC-MTCH, the SC-MRB corresponding to the SC-MTCH is suspended, and then the first type of data is received. After the first type of data is received, the SC-MRB is restored, to continue to receive the service data of the SC-MTCH. That the SC-MRB is suspended means that the SC-MRB is not temporarily released for later use. The SC-MRB is released only when it is determined that an MBMS service corresponding to the SC-MRB no longer needs to be received, thereby avoiding repeated release and establishment of the SC-MRB, saving network resources, and reducing power consumption of the terminal device.

In a first possible implementation of the first aspect, the restoring the SC-MRB based on a TMGI and/or a session identity corresponding to the SC-MRB includes: when the reception of the service data of the SC-MTCH is not completed, restoring the SC-MRB based on the TMGI and/or the session identity corresponding to the SC-MRB; or the releasing the SC-MRB based on a TMGI and/or a session identity corresponding to the SC-MRB includes: when the reception of the service data of the SC-MTCH is completed, releasing the SC-MRB based on the TMGI and/or the session identity corresponding to the SC-MRB. Specifically, that the reception of the service data of the SC-MTCH is not completed means that the reception of the MBMS service corresponding to the suspended SC-MRB is not completed and the terminal device needs to continue to receive the service data corresponding to the suspended SC-MRB. That the reception of the service data of the SC-MTCH is completed includes two cases: one case is that the MBMS service corresponding to the suspended SC-MRB is finished; the other case is that the MBMS service corresponding to the suspended SC-MRB is not finished, but the terminal device no longer needs to receive the MBMS service corresponding to the suspended SC-MRB.

In a second possible implementation of the first aspect, the suspending an SC-MRB corresponding to the SC-MTCH includes: reserving an RLC entity corresponding to the SC-MRB, and releasing a media access control MAC layer configuration and/or a physical layer configuration corresponding to the SC-MRB.

In a third possible implementation of the first aspect, after the suspending an SC-MRB corresponding to the SC-MTCH, the method further includes: informing, by indicating the TMGI and/or the session identity corresponding to the SC-MRB, a protocol layer above a radio resource control (RRC) that the SC-MRB has been suspended. The TMGI and/or the session identity corresponding to the SC-MRB is used to identify the SC-MRB. In a specific implementation, a status parameter may be used to indicate a suspending status of the SC-MRB corresponding to the TMGI and/or the session identity. Specifically, the protocol layer above the RRC layer may be an application layer.

In a fourth possible implementation of the first aspect, the restoring the SC-MRB based on a TMGI and/or a session identity corresponding to the SC-MRB includes: determining the SC-MRB based on the TMGI and/or the session identity corresponding to the SC-MRB, and determining, according to the SC-MRB, the RLC entity corresponding to the SC-MRB; and configuring a MAC layer and/or a physical layer for the SC-MRB based on information in a single cell-multimedia broadcast multicast service control channel SC-MCCH. Specifically, in a procedure of suspending the SC-MRB, only the media access control MAC layer configuration and/or the physical layer configuration corresponding to the SC-MRB is released, the RLC entity corresponding to the SC-MRB is reserved. Correspondingly, in a process of restoring the SC-MRB, the reserved RLC entity corresponding to the SC-MRB may be used and a MAC layer and/or a physical layer may be configured, to restore the SC-MRB.

In a fifth possible implementation of the first aspect, after the restoring the SC-MRB based on a TMGI and/or a session identity corresponding to the SC-MRB, the method further includes: informing, by indicating the TMGI and/or the session identity corresponding to the SC-MRB, the protocol layer above the RRC layer that the SC-MRB has been restored. Specifically, after being informed, the protocol layer above the RRC layer informs users through user interaction.

In a sixth possible implementation of the first aspect, the first type of data includes data of which a transmission priority is higher than that of the service data of the SC-MTCH.

With reference to the sixth possible implementation of the first aspect, in a seventh possible implementation, the data of which the transmission priority is higher than that of the service data of the SC-MTCH includes: configuration information in the SC-MCCH or information used during paging. The information used during paging may be a paging message, or may be a system message change indication that is transmitted on a physical downlink control channel PDCCH used for scheduling paging.

In an eighth possible implementation of the first aspect, the suspending an SC-MRB corresponding to the SC-MTCH when there is a first type of data to be received includes: when an SC-MCCH change notification is received, suspending the SC-MRB corresponding to the SC-MTCH; or suspending the SC-MRB corresponding to the SC-MTCH before paging listening.

According to a second aspect, an embodiment of the present invention provides a terminal device, including:

a receiving unit, configured to receive service data of a single cell-multimedia broadcast multicast service traffic channel SC-MTCH; and a processing unit, configured to: when the receiving unit receives the service data of the SC-MTCH, suspend a single cell-multimedia broadcast multicast service point to multipoint radio bearer SC-MRB corresponding to the SC-MTCH when there is a first type of data to be received, where the processing unit is further configured to: when the receiving unit completes the reception of the first type of data, restore or release the SC-MRB based on a temporary mobile group identity TMGI and/or a session identity corresponding to the SC-MRB.

The terminal device provided in the second aspect of the embodiments of the present invention is configured to perform the multicast bearer management method provided in the first aspect of the embodiments of the present invention. For details, refer to descriptions in the first aspect of the embodiments of the present invention. Details are not described herein again.

In a possible design, an entity device corresponding to the processing unit is a processor, and the processor is configured to perform the multicast bearer management method provided in the first aspect of the embodiments of the present invention; an entity device corresponding to the receiving unit is a receiver, and the receiver is configured to receive the service data of the single cell-multimedia broadcast multicast service traffic channel SC-MTCH. In one embodiment, the terminal device may further include a memory, the memory is configured to store application program code used by the processor to perform the method described above, and the processor is configured to execute the application program code stored in the memory.

According to a third aspect, an embodiment of the present invention provides a computer storage medium, configured to store computer program instructions used by a computer. The computer program instructions include a related program used to perform the first aspect.

According to a fourth aspect, an embodiment of the present invention provides a computer program, used to perform various methods provided in the first aspect.

According to a fifth aspect, an embodiment of the present invention provides a communications system, including a network communications device and the terminal device provided in the second aspect of the embodiments of the present invention.

BRIEF DESCRIPTION OF DRAWINGS

To describe the technical solutions in the embodiments of the present invention more clearly, the following briefly describes the accompanying drawings required for the embodiments.

DESCRIPTION OF EMBODIMENTS

The following describes the technical solutions in the embodiments of the present invention with reference to the accompanying drawings in the embodiments of the present invention.

Figure 1:
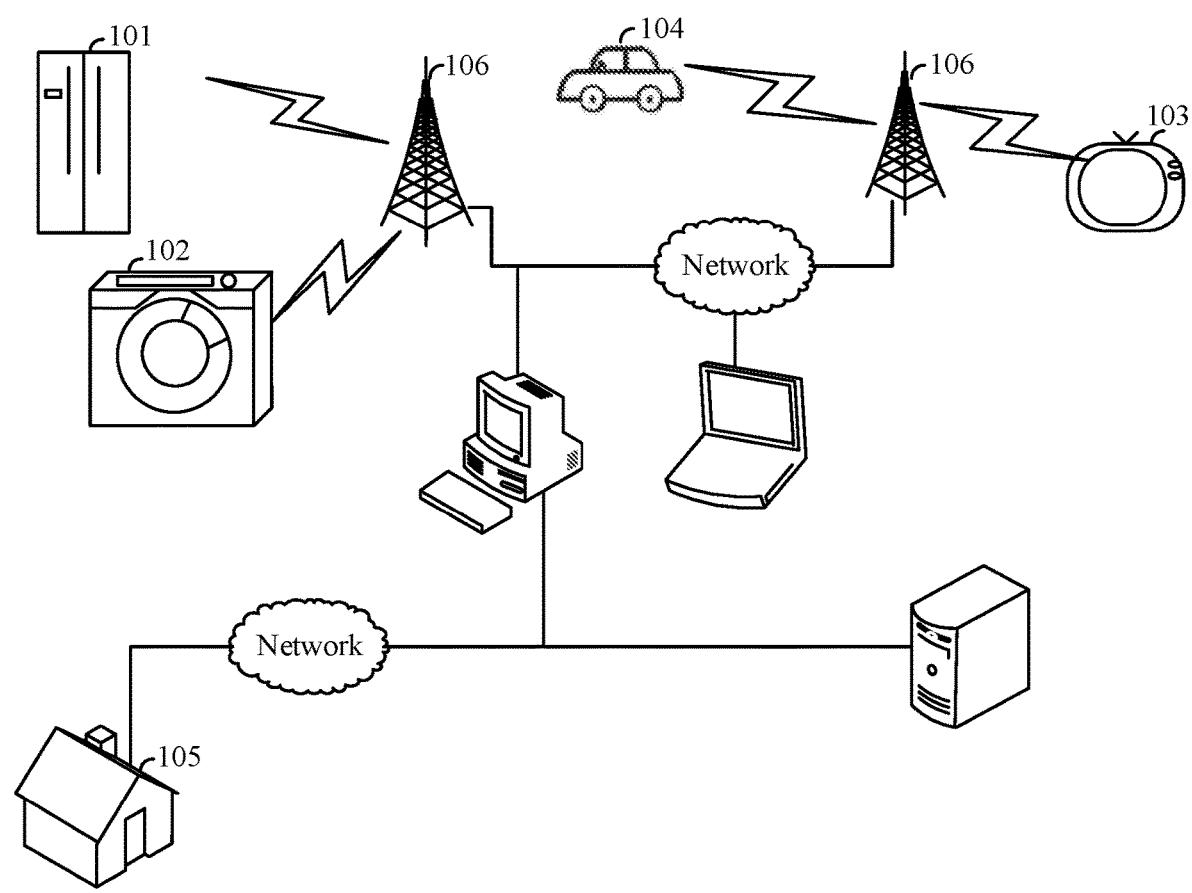
FIG. 1 is a schematic architecture diagram of a communications system according to an embodiment of the present invention.

The technical solutions in the embodiments of the present invention are mainly applicable to a wireless communications system in which a terminal device with low complexity and low power consumption is located, such as an IoT communications system, and an architecture of the communications system in the embodiments of the present invention may be shown in FIG. 1. FIG. 1 is a schematic architecture diagram of a communications system according to an embodiment of the present invention. In FIG. 1, a refrigerator 101, a washing machine 102, a television 103, a vehicle-mounted internet of things device 104, a building 105, and the like all belong to internet of things devices, have basic communication capabilities, and can collect various information about objects that need to be monitored, connected, or interact and send the information to a network through wireless communications technologies (which may be 3G, 4G, GPRS and other communications technologies) to implement communication between the objects. A base station 106 may be connected to tens of thousands of internet of things devices, and the internet of things devices communicate with other network nodes in the network through the base station 106 to implement collection and exchange of the various information.

Compared with a terminal device in a traditional cellular network, a terminal device in the embodiments of the present invention has fewer unnecessary functions, lower complexity, and lower power consumption. To reduce overheads of a protocol stack processing flow, the terminal device cannot receive data on a plurality of types of channels. The method in the embodiments of the present invention can prevent frequent release and establishment of an SC-MRB, thereby saving network resources and reducing overheads of a terminal device.

The terminal device mentioned in the embodiments of the present invention may be a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be an internet of things device that connects a sensor network layer to a transmission network layer and that collects data and sends the data to a network layer, such as a refrigerator, an air conditioner, and a washing machine in an intelligent housing system. The wireless terminal may also be called a system, a subscriber unit a subscriber station a mobile station a mobile terminal (Mobile), a remote station, an access point, a remote terminal, an access terminal, a user terminal, a user agent, a user device, or a user equipment.

Figure 2:
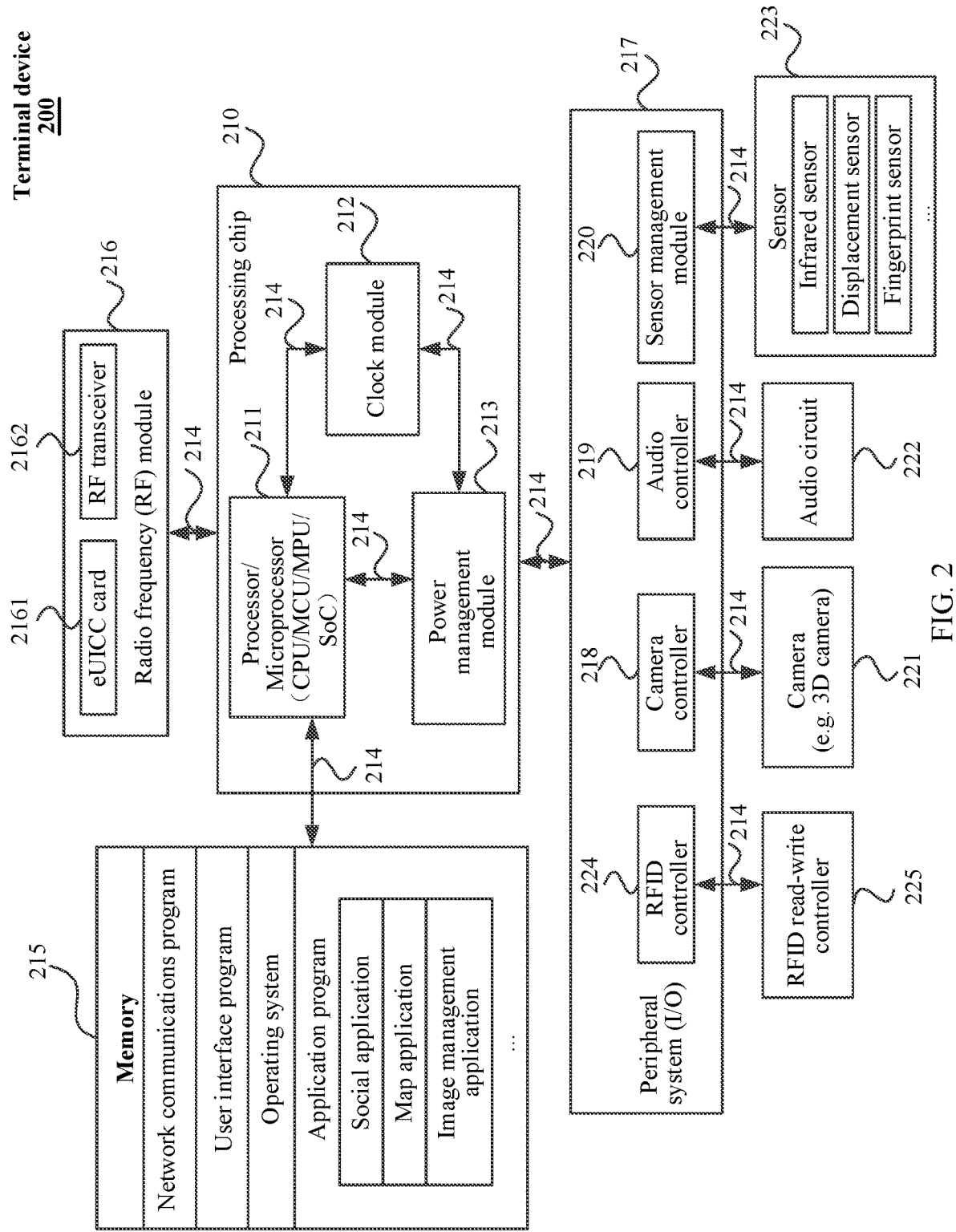
FIG. 2 is a structural block diagram of an implementation of a terminal device.

The following describes an implementation of the terminal device mentioned in the system in FIG. 1. FIG. 2 is a structural block diagram of an implementation of a terminal device 200. As shown in FIG. 2, the terminal device 200 may include a processing chip 210, a memory 215 (one or more computer-readable storage mediums), a radio frequency (RF) module 216, and a peripheral system 217. These components may communicate on one or more communications buses 214.

The peripheral system 217 is mainly configured to implement interaction between the terminal device 200 and a user/external environment, and mainly includes an input/output apparatus of the terminal device 200. In a specific implementation, the peripheral system 217 may include a camera controller 218, an audio controller 219, and a sensor management module 220. The controllers may be coupled to respective corresponding peripheral devices (such as a camera 221, an audio circuit 222, and a sensor 223). In some embodiments, the camera 221 may be a 3D camera. In some embodiments, the sensor 223 may be an infrared sensor, a fingerprint sensor, a displacement sensor, an energy consumption sensor, a temperature sensor, a humidity sensor, an optical sensor, and the like. It should be noted that the peripheral system 217 may further include other I/O peripheral devices. For example, the peripheral system 217 further includes a radio frequency identification (RFID) controller 224, where an RFID read-write controller is coupled to an RFID reader-writer 225.

The processing chip 210 may include a processor/microprocessor 211, a clock module 212, and a power management module 213. The clock module 212 integrated in the processing chip 220 is mainly configured to produce a clock for data transmission and timing control for the processor/microprocessor 211. The power management module 213 integrated in the processing chip 220 is mainly configured to provide stable and highly accurate voltage for the processor/microprocessor 211, the radio frequency module 216, and the peripheral system 217. In some embodiments, the processor/microprocessor 211 may be a central processing unit (CPU), an embedded micro controller unit (MCU), an embedded micro processor unit (MPU), an embedded system on chip (SoC), or the like.

The processor/microprocessor 211 may include one or more processors. For example, the processor/microprocessor 211 may include one or more microprocessors, or include one or more microprocessors and one or more application processors. When the processor/microprocessor 211 includes a plurality of processors, the plurality of processors may be integrated in one processing chip, or may be independent processing chips. One processor may include one or more processor cores (or referred to as processing cores).

The radio frequency module 216 is configured to send and receive a radio frequency signal, and mainly integrates a receiver and a transmitter of the terminal device 200. The radio frequency module 216 communicates with a communications network and another communications device by using the radio frequency signal. In a specific implementation, the radio frequency module 216 may include but is not limited to: an antenna system, an RF transceiver, one or more amplifiers, a tuner, one or more oscillators, a digital signal processor, a CODEC chip, a storage medium, and the like. In some embodiments, the radio frequency module 216 may be implemented on a single chip.

The memory 215 is coupled to the processor/microprocessor 211 and is configured to store various software programs and/or a plurality of sets of instructions. In a specific implementation, the memory 215 may include a high-speed random access memory, and may further include a non-volatile memory, such as one or more disk storage devices, one or more flash memory devices, or other non-volatile solid-state storage devices. The memory 215 may store an operating system (briefly referred to as a system below), for example, an embedded operating system such as Android, iOS, Windows, or Linux. The memory 215 may further store a network communications program, and the network communications program may be used to communicate with one or more adjuncts, one or more terminal devices, and one or more network devices. The memory 215 may further store a user interface program, and the user interface program may visually and vividly display content of an application program on a graphical operation interface, and receive a control operation of a user for the application program by using input controls such as a menu, a dialog box, and a key. The memory 215 may further store one or more application programs.

A program of the operating system includes a computer program which can implement a multicast bearer management method provided in the embodiments of the present invention, so that after the processor/microprocessor 211 reads the program and runs the operating system, the operating system may have a multicast bearer management function provided in the embodiments of the present invention.

The following embodiments describe a multicast bearer management method and an apparatus provided in the embodiments of the present invention with a terminal device as an executive body.

In the embodiments of the present invention, the noun "suspending" means that all or some of resources corresponding to a current transaction, process, or session are not temporarily closed/released/deleted when other tasks such as transactions, processes, or sessions need to be executed currently. After executing the other tasks such as the transactions, the processes, or the sessions, the all or some of resources corresponding to the current transaction, process, or session may be directly used to continue to execute the current task, process, or session. In an optional way, suspending an SC-MRB may be replaced with 0freezing an SC-MRB, mothballing an SC-MRB, making an SC-MRB dormant, and locking an SC-MRB, and other descriptions. A person skilled in the art can understand the meaning.

In the embodiments of the present invention, the noun "restoring" corresponds to the noun "suspending", and means that after execution of other tasks such as transactions, processes, or sessions is completed, all or some of resources corresponding to a task such as a transaction, a process, or a session that is idle/unused before the execution of the other tasks such as the transactions, the processes, or the sessions are reconfigured/reused, to provide an execution environment or resources for the task such as the transaction, the process, or the session that is idle/unused. In an optional way, restoring an SC-MRB may be replaced with unfreezing an SC-MRB, unmothballing an SC-MRB, awakening an SC-MRB, and unlocking an SC-MRB, and other descriptions. A person skilled in the art can understand the meaning.

The suspending and the restoring are described below by using an example. For example, in an operating system of a computer, memory resources are limited. When the memory resources of the computer are insufficient, the operating system properly arranges programs in the memory, and temporarily calls some processes out of the memory so that these processes do not occupy memory resources, that is, to suspend the processes. When a condition allows (for example, when running of some processes in the memory is finished and memory resources occupied by these processes are released, current memory resources are sufficient), the operating system recalls the previously suspended processes into the memory, that is, to restore the processes.

Figure 3:
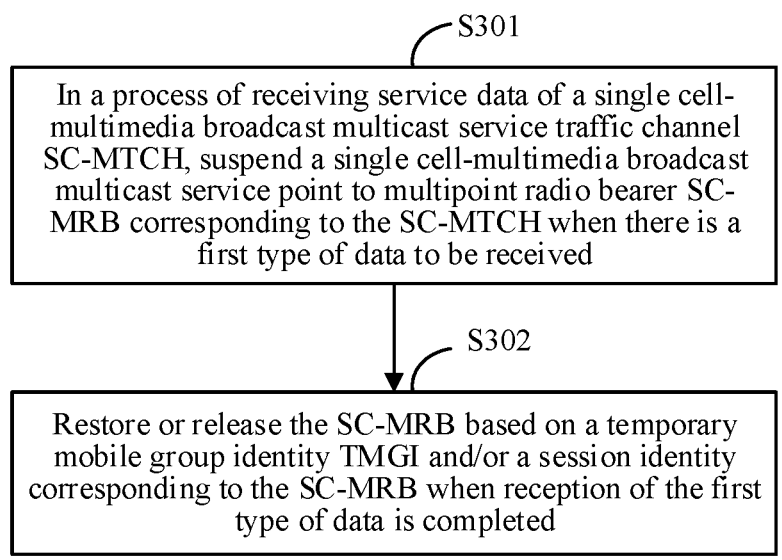
FIG. 3 is a schematic flowchart of a multicast bearer management method according to an embodiment of the present invention.

FIG. 3 is a schematic flowchart of a multicast bearer management method according to an embodiment of the present invention. The method may be implemented on an internet of things terminal device such as the refrigerator 101 or the washing machine 102 in FIG. 1, or on a terminal device meeting the structural block diagram of FIG. 2. The method at least includes the following operations.

In operation S301, in a process of receiving service data of a single cell-multimedia broadcast multicast service traffic channel SC-MTCH, suspend a single cell-multimedia broadcast multicast service point to multipoint radio bearer SC-MRB corresponding to the SC-MTCH when there is a first type of data to be received.

For example, a terminal device with low complexity and low power consumption uses a relatively small bandwidth and can transmit data only on one carrier at a same time. Different physical layer channels of the terminal device are generally time-division multitasks, that is, different physical layer channels can appear or be established only at different times. When another physical layer channel needs to be established, the terminal device needs to release a currently established physical channel. For example, physical channels of the terminal device include a physical downlink control channel (PDCCH), a physical broadcast channel (PBCH), and a physical downlink shared channel (PDSCH), so that the terminal can establish or run only one of the PDCCH, the PBCH, and the PDSCH at a same moment or in a same slot. The terminal device provides limited resources for a physical layer of an upper layer protocol entity at a same moment, and can provide a transmission link to only one logical channel at a same time. When data on a second logical channel needs to be received in a process of receiving data on a first logical channel, a target logical channel with a higher transmission priority is determined based on a transmission priority of the first logical channel and a transmission priority of the second logical channel, and a transmission link is preferentially provided for the target logical channel.

Specifically, a transmission priority of the first type of data is higher than that of the service data of the SC-MTCH, and the first type of data includes configuration information in the SC-MCCH or information used during paging. In a specific implementation, for example, the first type of data may be configuration information such as scheduling information in the SC-MCCH and timing information of a single cell-point to multipoint mechanism, or may be information such as a paging message and a paging change indication used during paging.

Specifically, the SC-MRB corresponding to the SC-MTCH may be suspended when an SC-MCCH change notification is received. The SC-MCCH change notification indicates that the configuration information of the SC-MTCH included in the SC-MCCH has been updated or is to be updated. A transmission priority of the configuration information of the SC-MTCH is higher than that of the service data of the SC-MTCH. The terminal device needs to preferentially receive the configuration information of the SC-MTCH and update a configuration of the SC-MTCH.

Specifically, the SC-MRB corresponding to the SC-MTCH may alternatively be suspended before paging listening when paging needs to be received. In an air interface paging mechanism, the terminal device receives paging information through discontinuous reception (DRX), to reduce power consumption. An RRC layer of the terminal device controls a physical layer to listen on a physical downlink control channel (PDCCH) when a paging cycle arrives, and receives a paging message on a physical downlink shared channel (PDSCH) according to an instruction on the PDCCH, to determine whether a network side pages the terminal device, or whether there is a system message change indication sent by a network. The paging is an action initiated by the network side to determine a specific location of the terminal device or to update a system message, and a transmission priority of the paging is higher than that of the service data of the SC-MTCH. Therefore, when the paging needs to be received, the terminal device preferentially listens on the PDCCH, and when there is a paging message, the terminal device preferentially receives the paging message. In an optional way, the terminal device may suspend the SC-MRB corresponding to the SC-MTCH for a preset period of time before the paging cycle arrives.

Specifically, the SC-MRB is a radio bearer established for receiving the service data of the SC-MTCH. When there is a first type of data to be received, because the transmission priority of the to-be-received first type of data is higher than that of the service data of the SC-MTCH, the first type of data needs to be preferentially transmitted, and the transmission link is preferentially provided for the first type of data. That is, a corresponding physical layer and/or MAC layer needs to be configured for the first type of data.

Specifically, the terminal device can provide a transmission link to only one logical channel at a same time. When the SC-MRB is not released, the suspending the SC-MRB includes: reserving an RLC entity corresponding to the SC-MRB, and releasing a media access control MAC layer configuration and/or a physical layer configuration corresponding to the SC-MRB.

It should be understood that when the SC-MRB is not released, if the physical layer configuration corresponding to the SC-MRB is released, when the RLC entity corresponding to the SC-MRB is reserved, the MAC layer configuration corresponding to the SC-MRB is also reserved.

In one embodiment, after the suspending the SC-MRB, the method further includes: informing, by indicating a temporary mobile group identity (TMGI) and/or a session identity corresponding to the SC-MRB, a protocol layer above the RRC layer that the SC-MRB has been suspended.

The TMGI is used to distinguish between different MBMS services. For example, one MBMS service corresponds to one TMGI. The session identity is used to distinguish between different MBMS sessions. For example, one MBMS service corresponds to one MBMS session identity. Both the TGGI and the session identity can be used to identify an SC-MRB and an MBMS service corresponding to the SC-MRB. The TMGI and/or the session identity corresponding to the SC-MRB is indicated to the protocol layer above the RRC layer, so that the protocol layer above the RRC can know that an SC-MRB corresponding to a target MBMS service is currently suspended, and the terminal device cannot carry out the target MBMS service for the time being.

Specifically, when the TMGI and/or the session identity is indicated to the upper layer, a status parameter may further be used to indicate a status of the SC-MRB. For example, if a value of the status parameter is 11, it indicates that the SC-MRB is established; if the value of the status parameter is 01, it indicates that the SC-MRB has been suspended; if the value of the status parameter is 10, it indicates that the SC-MRB has been restored; if the value of the status parameter is 00, it indicates that the SC-MRB has been released.

Specifically, the protocol layer above the RRC may be an application layer. For example, a user is watching a television program by using a client of the terminal device, that is, an MBMS service that is currently received by the terminal device is the television program, and the SC-MRB provides a reception service for the television program. When there is a first type of data to be received, the terminal device suspends the SC-MRB. In this case, the terminal device cannot receive the MBMS service corresponding to the SC-MRB for the time being. After the application layer is informed, by indicating the TMGI and/or the session identity corresponding to the SC-MRB, that the SC-MRB has been suspended, prompt information similar to "The current service is unavailable" is displayed on a user interface of the client.

In one embodiment, after the suspending the SC-MRB, the method further includes: establishing a first radio bearer of the first type of data and receiving the first type of data on the first radio bearer.

In one embodiment, the first radio bearer may be a signaling radio bearer or a data radio bearer.

Specifically, the establishing a first radio bearer includes: establishing a first RLC entity corresponding to the first type of data and configuring a MAC layer and a physical layer corresponding to the first type of data.

In operation S302, restore or release the SC-MRB based on a temporary mobile group identity TMGI and/or a session identity corresponding to the SC-MRB when reception of the first type of data is completed.

In one embodiment, when the reception of the first type of data is completed, the first radio bearer established for the first type of data is released, and the RLC entity corresponding to the first type of data, and a corresponding MAC layer configuration and a physical layer configuration are released.

Specifically, that reception of the first type of data is completed may mean that reception of all configuration information in the SC-MCCH is completed, or that reception of information used during paging is completed.

Specifically, when the reception of the service data of the SC-MTCH is not completed, the SC-MRB is restored based on the TMGI and/or the session identity corresponding to the SC-MRB; when the reception of the service data of the SC-MTCH is completed, the SC-MRB is restored and the SC-MRB is released based on the TMGI and/or the session identity corresponding to the SC-MRB.

Specifically, that the reception of the service data of the SC-MTCH is not completed means that the reception of the MBMS service corresponding to the suspended SC-MRB is not completed and the terminal device needs to continue to receive the service data corresponding to the suspended SC-MRB. That the reception of the service data of the SC-MTCH is completed includes two cases: one case is that the MBMS service corresponding to the suspended SC-MRB is finished; the other case is that the MBMS service corresponding to the suspended SC-MRB is not finished, but the terminal device no longer needs to receive the MBMS service corresponding to the suspended SC-MRB.

The first type of data is used as an example below to describe cases that the reception of the service data of the SC-MTCH is completed and that the reception of the service data of the SC-MTCH is not completed.

In one case, a terminal device is currently receiving service data of a first MBMS service on a first SC-MRB, and a base station sends an SC-MCCH change notification to the terminal device. In this case, the terminal device suspends the first SC-MRB and receives the configuration information in the SC-MCCH. It is assumed that the base station updates an MBMS service by using the configuration information and adds a second MBMS service, and the first MBMS service is not finished yet after the reception of the configuration information is finished. If a user holding the terminal device is interested in the second MBMS service and wants the terminal device to receive the second MBMS service, the terminal device no longer needs to receive the first MBMS service although the first MBMS service is not finished. That is, reception of service data of an SC-MTCH corresponding to the first SC-MRB is completed, the first SC-MRB is released, and a second SC-MRB corresponding to the second MBMS service is established. If the user holding the terminal device is still interested in the first MBMS service and wants the terminal device to continue to receive the first MBMS service, the terminal device needs to continue to receive the first MBMS service. That is, reception of service data of an SC-MTCH corresponding to the first SC-MRB is not completed, and the terminal device restores the first SC-MRB and releases the first SC-MRB when the first MBMS service is finished.

In another case, the terminal device is currently receiving service data of a first MBMS service through a first SC-MRB and currently needs to receive paging. In this case, the terminal device suspends the first SC-MRB and receives the paging. The paging is not related to update of an MBMS service. After the paging is received, if the terminal device is not paged by a network, the first MBMS service is not finished, and a user is still interested in the first MBMS service, the terminal device needs to continue to receive the first MBMS service. That is, reception of service data of an SC-MTCH is not completed, and the terminal device restores the first SC-MRB and releases the first SC-MRB when the first MBMS service is finished. If the first MBMS service is not finished but the user finds, by receiving a paging message, that the terminal device is paged by a network, an RRC connection needs to be established to respond to the network. In this case, the terminal device may no longer receive the first MBMS service. That is, reception of service data of an SC-MTCH is completed, and the terminal device releases the first SC-MRB.

Specifically, the restoring the SC-MRB includes: determining the SC-MRB based on the TMGI and/or the session identity corresponding to the SC-MRB, and determining, according to the SC-MRB, the RLC entity corresponding to the SC-MRB; and configuring a MAC layer and/or a physical layer for the SC-MRB based on information in the SC-MCCH.

Specifically, the RLC entity that corresponds to the SC-MRB and that is reserved in the SC-MRB suspending process may be used for restoring the SC-MRB.

Specifically, the configuring a MAC layer and/or a physical layer includes: receiving single cell-point to multipoint configuration (SCPTMConfiguration) information, where the SCPTMConfiguration information includes an SC-MTCH information list sc-mtch-InfoList, and each SC-MTCH corresponds to one piece of sc-mtch-Info in the sc-mtch-InfoList; and configuring the MAC layer and/or the physical layer based on the sc-mtch-Info.

Specifically, the sc-mtch-Info includes parameter information such as a group-radio network temporary identity (G-RNTI) and SC-MTCH scheduling information (sc-mtch-SchedulingInfo). The G-RNTI is used to scramble a channel, and the sc-mtch-SchedulingInfo is DRX information set by the SC-MTCH. When the sc-mtch-Info does not include the sc-mtch-SchedulingInfo, information about the SC-MTCH may be transmitted in any subframe.

In one embodiment, after the restoring the SC-MRB, the method further includes: informing, by indicating the TMGI and/or the session identity corresponding to the SC-MRB, the protocol layer above the RRC layer that the SC-MRB has been suspended.

Specifically, in the procedure of suspending the SC-MRB in operation S301, the protocol layer above the RRC layer is informed, by indicating the TMGI and/or the session identity corresponding to the SC-MRB, that the SC-MRB has been suspended. Correspondingly, when the SC-MRB is restored, the protocol layer above the RRC layer may be informed that the corresponding SC-MRB has been restored.

In the method described in FIG. 3, if the first type of data needs to be received in the process of receiving the service data of the SC-MTCH, the SC-MRB corresponding to the SC-MTCH is suspended, and then the first type of data is received. After the reception of the first type of data is completed, the SC-MRB is then restored, the service data of the SC-MTCH continues to be received, the SC-MRB is suspended, only the MAC layer configuration and/or the physical layer configuration are released, and the RLC entity corresponding to the SC-MRB is reserved, where releasing the RLC entity is releasing an RLC PDU cached in the RLC entity is reserved. When the SC-MRB is restored, only the MAC layer and/or the physical layer needs to be reconfigured based on information in the SC-MCCH, and there is no need to reestablish the RLC entity corresponding to the SC-MRB or receive the RLC PDU again, thereby avoiding repeated release and establishment of the SC-MRB, saving network resources, and reducing power consumption of the terminal device.

The foregoing mainly describes the process of the method provided in the embodiments of the present invention. The following describes changes of a logical transmission link and the RLC entity in the method provided in the embodiments of the present invention in combination with a protocol structure, referring to FIG. 4 and FIG. 5.

Figure 4:
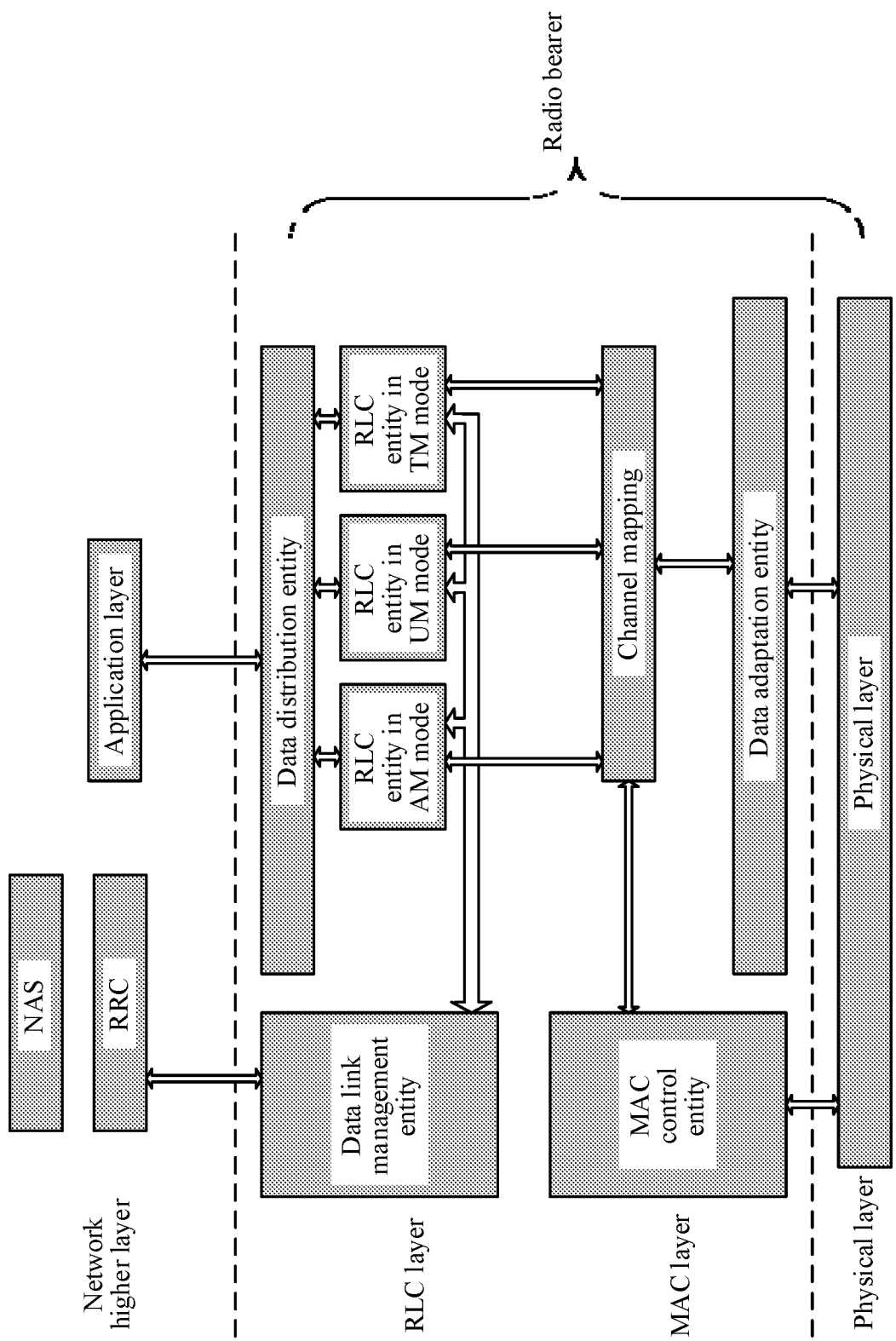
FIG. 4 is a schematic structural diagram of layers of a wireless communication protocol according to an embodiment of the present invention.

FIG. 4 is a possible schematic structural diagram of layers of a wireless communication protocol. The wireless communication protocol includes a higher network layer, an RLC layer, a MAC layer, and a physical layer from top to bottom. A radio resource control (RRC) layer, a network layer, a transport layer, an application layer, and a non-access stratum belong to the network higher layer. The RLC layer and the MAC layer belong to a layer-2 protocol of OSI, and the physical layer belongs to a layer-1 protocol of OSI. In the embodiments of the present invention, the RRC layer, the RLC layer, the MAC layer, and the physical layer are related to the establishment, suspension, restoration, and release of the SC-MRB.

The RRC layer can implement notification of an MBMS service and establishment, modification, and release of a radio bearer corresponding to the MBMS service. The RRC layer instructs the RLC layer, the MAC layer, and the physical layer to perform corresponding operations, to complete the establishment, modification, and release of the radio bearer.

The RLC layer mainly implements segmentation and recombination of protocol service data units, establishment, release and configuration of various data logical links. The RLC layer includes a plurality of RLC entities and control entities, and one RLC entity corresponds to one RB. The RLC entity may be configured in an unacknowledged mode (UM), an acknowledged mode (AM), and a transparent mode (TM) according to different transmission service types. The RLC entity corresponding to the SC-MRB in the embodiments of the present invention is in an unacknowledged mode. The RLC control entity mainly implements establishment, release and parameter configuration of data logical links.

The MAC layer is located between the physical layer and the RLC layer and provides a service upward for the RLC layer. The RLC layer sends a PDU of the RLC layer to the MAC layer on a logical channel. The MAC layer uses downward a physical channel, to use a service provided by the physical layer. The MAC layer mainly implements mapping between a logical channel and a physical channel, dynamic adaptation between a service data unit (SDU) on the MAC layer and a data transmission block on the physical layer, dynamic configuration of a physical-layer transmission parameter, and the like. In an embodiment of the present invention, the MAC layer transmits PDUs of the service data of the SC-MTCH to the RLC entity so that the RLC entity recombines the PDUs.

The physical layer implements functions such as encoding and decoding of a physical channel, multiplexing and demultiplexing of the physical channel, and radio frequency processing.

Figure 5:
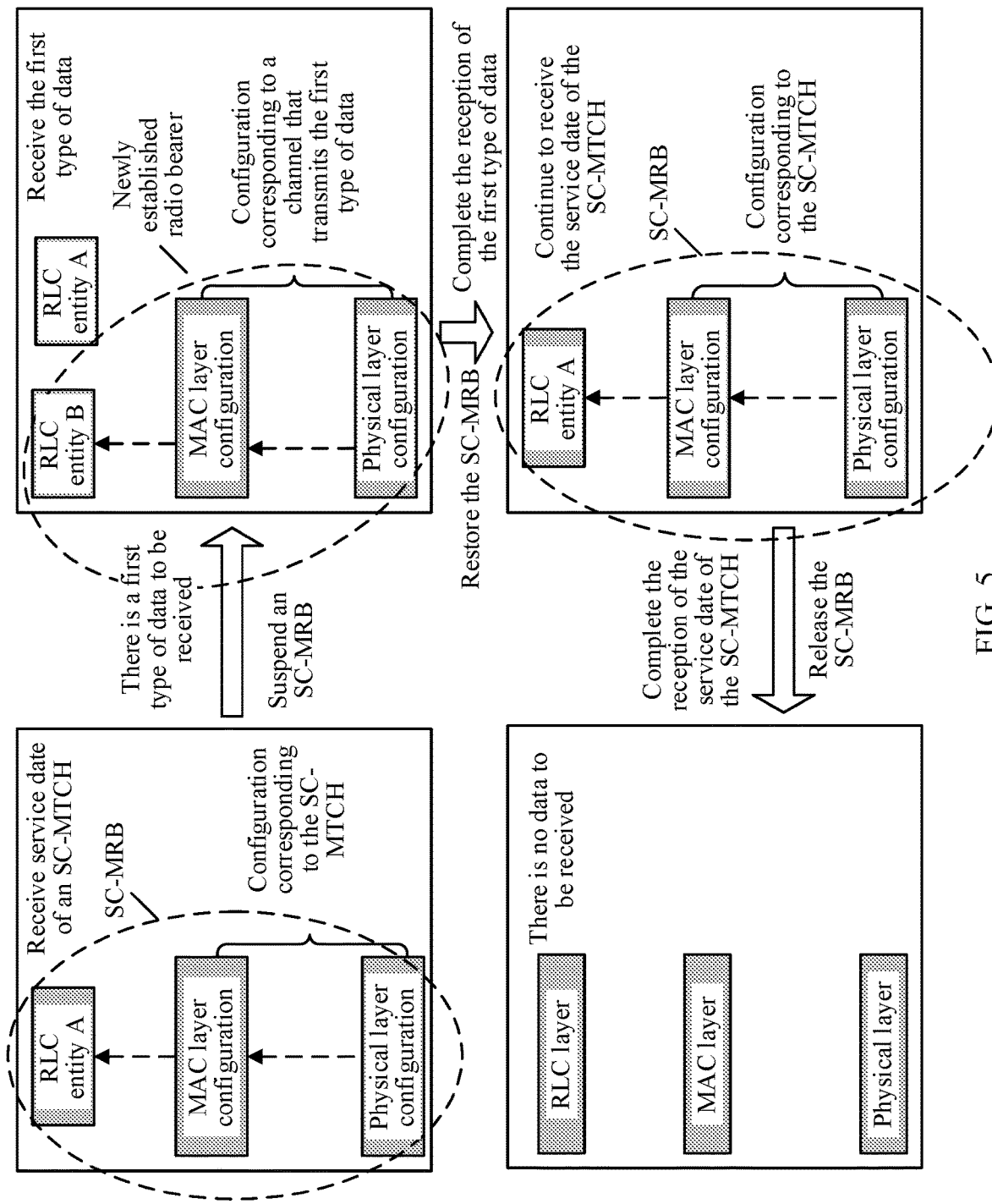
FIG. 5 is a schematic diagram showing changes of a logical transmission link and an RLC entity performing a multicast bearer management method according to an embodiment of the present invention.

In the process of receiving the service data of the SC-MTCH, changes of the logical transmission link in the terminal device may be shown in FIG. 5. FIG. 5 is a schematic diagram showing changes of a logical transmission link and an RLC entity performing a multicast bearer management method according to an embodiment of the present invention. First, the terminal device is receiving service data of an SC-MTCH on an SC-MRB, an RLC entity A is an RLC entity corresponding to the SC-MRB, and both a MAC layer configuration and a physical layer configuration are configurations corresponding to the SC-MTCH. When there is a first type of data to be received, where a transmission priority of the first type of data is higher than that of the service data of the SC-MTCH, a transmission link is preferentially provided for the first type of data. A MAC layer and a physical layer of the terminal device have limited resources, so that the MAC layer configuration and the physical layer configuration are released, and the RLC entity A is reserved. In this case, the SC-MRB is suspended, and an RLC entity B is newly established. The MAC layer and the physical layer that are released are reconfigured based on a logical channel type corresponding to the to-be-received first type of data, and the first type of data is received by a newly established radio bearer. After reception of the first type of data is completed, the RLC entity B is released, the MAC layer configuration and the physical layer configuration are released, and both the MAC layer and the physical layer are configured for the SC-MTCH. The RLC entity A, the configured MAC layer, and the configured physical layer constitute the SC-MRB. In this case, the SC-MRB is restored, and the service data of the SC-MTCH continues to be received on the restored SC-MRB. When the reception of the service data of the SC-MTCH is completed, the RLC entity A, and the MAC layer configuration and the physical layer configuration corresponding to the SC-MRB are released to release the SC-MRB. In an optional case, after reception of the first type of data is completed, and after the RLC entity B and the MAC layer configuration and the physical layer configuration are released, when the service data of the SC-MTCH no longer needs to be received, the RLC entity A may be directly released. The case that the service data of the SC-MTCH does not need to be received is described in the foregoing embodiment by using an example. Details are not described herein again.

Figure 6:
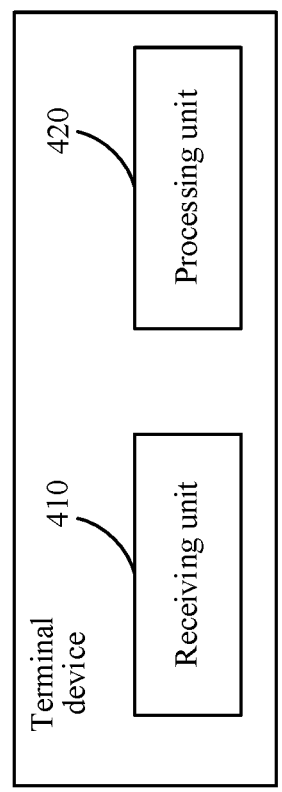
FIG. 6 is a schematic structural diagram of a terminal device according to an embodiment of the present invention.

FIG. 6 shows a possible schematic structural diagram of the terminal device mentioned in the foregoing embodiments. The terminal device includes a receiving unit 410 and a processing unit 420, and detailed descriptions of each unit are as follows:

The receiving unit 410 is configured to receive service data of a single cell-multimedia broadcast multicast service traffic channel SC-MTCH;

The processing unit 420 is configured to: when the receiving unit 410 receives the service data of the single cell-multimedia broadcast multicast service traffic channel SC-MTCH, suspend a single cell-multimedia broadcast multicast service point to multipoint radio bearer SC-MRB corresponding to the SC-MTCH when there is a first type of data to be received;

The processing unit 420 is further configured to: when the receiving unit 410 completes the reception of the first type of data, restore or release the SC-MRB based on a temporary mobile group identity TMGI and/or a session identity corresponding to the SC-MRB.

In one embodiment, the processing unit 420 is specifically configured to:

when the receiving unit 410 does not complete the reception of service data of the SC-MTCH, restore the SC-MRB based on the TMGI and/or the session identity corresponding to the SC-MRB; or when the receiving unit 410 completes the reception of service data of the SC-MTCH, release the SC-MRB based on the TMGI and/or the session identity corresponding to the SC-MRB.

In one embodiment, the processing unit 420 is specifically configured to:

reserve an RLC entity corresponding to the SC-MRB, and release a media access control MAC layer configuration and/or a physical layer configuration corresponding to the SC-MRB.

In one embodiment, the processing unit 420 is specifically configured to:

inform, by indicating the TMGI and/or the session identity corresponding to the SC-MRB, a protocol layer above an RRC layer that the SC-MRB has been suspended.

In one embodiment, the processing unit 420 is specifically configured to:

determine the SC-MRB based on the TMGI and/or the session identity corresponding to the SC-MRB, and determine, according to the SC-MRB, the RLC entity corresponding to the SC-MRB; and configure a MAC layer and/or a physical layer for the SC-MRB based on information in a single cell-multimedia broadcast multicast service control channel SC-MCCH.

In one embodiment, the processing unit 420 is specifically configured to:

inform, by indicating the TMGI and/or the session identity corresponding to the SC-MRB, the protocol layer above the RRC layer that the SC-MRB has been restored.

Specifically, the first type of data includes data of which a transmission priority is higher than that of the service data of the SC-MTCH.

Specifically, the data of which the transmission priority is higher than that of the service data of the SC-MTCH includes:

configuration information in the SC-MCCH or information used during paging.

The processing unit 420 is specifically configured to:

suspend the SC-MRB corresponding to the SC-MTCH when the receiving unit 410 receives an SC-MCCH change notification; or suspend the SC-MRB corresponding to the SC-MTCH before paging listening.

In a possible implementation, the processing unit 420 may correspond to the processor 211 or the processing chip 210 in the terminal device shown in FIG. 2, and the receiving unit may correspond to an RF transceiver 2162 or the RF module 216 in the terminal shown in FIG. 2. The processing unit 420 may further cooperate with the receiving unit 410 to perform all the operations in the method embodiment shown in FIG. 3.

The controller/processor configured to perform functions of the foregoing terminal device in the embodiments of the present invention may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor.

In the embodiment shown in FIG. 6, when the terminal device is receiving the service data of the SC-MTCH, if the first type of data needs to be received, the SC-MRB corresponding to the SC-MTCH is suspended, and then the first type of data is received. After the reception of the first type of data is completed, the SC-MRB is restored, and the service data of the SC-MTCH continues to be received, the SC-MRB is suspended, only the MAC layer configuration and/or the physical layer configuration are released, the RLC entity corresponding to the SC-MRB is reserved. When the SC-MRB is restored, only the MAC layer and/or the physical layer needs to be reconfigured based on information in the SC-MCCH, and there is no need to reestablish the RLC entity corresponding to the SC-MRB, thereby avoiding frequent release and establishment of the SC-MRB, saving network resources, and reducing power consumption of the terminal device.

The embodiments of the present invention further provide a computer storage medium, and the computer storage medium stores a computer program. The computer program includes program instructions, and when the program instructions are executed by a computer, the computer is enabled to perform the method described in the foregoing embodiment. The computer may be a part of the terminal device mentioned above.

The embodiments of the present invention further provide a computer program, including program instructions. When executed by a computer, the program instructions are used to perform the method described in the foregoing embodiment.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may include: a magnetic disk, an optical disc, a read-only memory (ROM), or a random access memory (RAM).

Method or algorithm operations described in combination with the content disclosed in the present invention may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A multicast bearer management method, comprising:
in a process of reception of service data of a single cell-multimedia broadcast multicast service traffic channel (SC-MTCH) by a terminal device, determining, by the terminal device, that the terminal device is to receive a first type of data;
suspending, by the terminal device, a single cell-multimedia broadcast multicast service point to multipoint radio bearer (SC-MRB) corresponding to the SC-MTCH, wherein suspending the SC-MRB corresponding to the SC-MTCH further comprises reserving a radio link control (RLC) entity corresponding to the SC-MRB, and releasing one of a media access control (MAC) layer configuration or a physical layer configuration corresponding to the SC-MRB; and
in response to determining that reception of the first type of data is completed, restoring or releasing the SC-MRB based on one of a temporary mobile group identity (TMGI) or a session identity corresponding to the SC-MRB.

2. The method according to claim 1,
wherein restoring the SC-MRB based on one of the TMGI or the session identity corresponding to the SC-MRB comprises:
when the reception of the service data of the SC-MTCH is not completed, restoring the SC-MRB based on one of the TMGI or the session identity corresponding to the SC-MRB; and
wherein releasing the SC-MRB based on one of the TMGI or the session identity corresponding to the SC-MRB comprises:
when the reception of the service data of the SC-MTCH is completed, releasing the SC-MRB based on one of the TMGI or the session identity corresponding to the SC-MRB.

3. The method according to claim 1, further comprising:
after suspending the SC-MRB corresponding to the SC-MTCH, informing by indicating one of the TMGI or the session identity corresponding to the SC-MRB, a protocol layer above a radio resource control (RRC) layer that the SC-MRB has been suspended.

4. The method according to claim 1, wherein restoring the SC-MRB based on one of the TMGI or the session identity corresponding to the SC-MRB comprises:
determining the SC-MRB based on one of the TMGI or the session identity corresponding to the SC-MRB, and determining, according to the SC-MRB, the RLC entity corresponding to the SC-MRB; and
configuring one of a MAC layer or a physical layer for the SC-MRB based on information in a single cell-multimedia broadcast multicast service control channel (SC-MCCH).

5. The method according to claim 1, after restoring the SC-MRB based on one of the TMGI or the session identity corresponding to the SC-MRB, further comprising:
informing, by indicating one of the TMGI or the session identity corresponding to the SC-MRB, a protocol layer above a radio resource control (RRC) layer that the SC-MRB has been restored.

6. The method according to claim 1, wherein the first type of data comprises data of which a transmission priority is higher than that of the service data of the SC-MTCH.

7. The method according to claim 6, wherein the data of which the transmission priority is higher than that of the service data of the SC-MTCH comprises:
configuration information in the SC-MCCH or information used during paging.

8. The method according to claim 1, wherein suspending the SC-MRB corresponding to the SC-MTCH when there is the first type of data to be received comprises:
suspending the SC-MRB corresponding to the SC-MTCH when an SC-MCCH change notification is received; or
suspending the SC-MRB corresponding to the SC-MTCH before paging listening.

9. A communication device, comprising:
a receiver, configured to receive service data of a single cell-multimedia broadcast multicast service traffic channel (SC-MTCH); and
a processor, configured to:
when the receiver is in a process of reception of the service data of the SC-MTCH, suspend a single cell-multimedia broadcast multicast service point to multipoint radio bearer (SC-MRB) corresponding to the SC-MTCH when the receiver determines that it is to receive a first type of data,
reserve a radio link control (RLC) entity corresponding to the SC-MRB, and release one of a media access control (MAC) layer configuration or a physical layer configuration corresponding to the SC-MRB, and
when the receiver completes reception of the first type of data, restore or release the SC-MRB based on one of a temporary mobile group identity (TMGI) or a session identity corresponding to the SC-MRB.

10. The communication device according to claim 9, wherein the processor is configured to:
when the receiver does not complete the reception of the service data of the SC-MTCH, restore the SC-MRB based on one of the TMGI or the session identity corresponding to the SC-MRB; or
when the receiver completes the reception of the service data of the SC-MTCH, release the SC-MRB based on one of the TMGI or the session identity corresponding to the SC-MRB.

11. The communication device according to claim 9, wherein the processor is configured to:
inform, by indicating one of the TMGI or the session identity corresponding to the SC-MRB, a protocol layer above a radio resource control (RRC) layer that the SC-MRB has been suspended.

12. The communication device according to claim 9, wherein the processor is configured to:
determine the SC-MRB based on one of the TMGI or the session identity corresponding to the SC-MRB, and determine, according to the SC-MRB, the RLC entity corresponding to the SC-MRB; or
configure one of a MAC layer or a physical layer for the SC-MRB based on information in a single cell-multimedia broadcast multicast service control channel SC-MCCH.

13. The communication device according to claim 9, wherein the processor is configured to:
inform, by indicating one of the TMGI or the session identity corresponding to the SC-MRB, a protocol layer above a radio resource control (RRC) layer that the SC-MRB has been restored.

14. The communication device according to claim 9, wherein the first type of data comprises data of which a transmission priority is higher than that of the service data of the SC-MTCH.

15. The communication device according to claim 14, wherein the data of which the transmission priority is higher than that of the service data of the SC-MTCH comprises:
information used during paging.

16. The communication device according to claim 10, wherein the processor is configured to:
suspend the SC-MRB corresponding to the SC-MTCH when the receiver receives an SC-MCCH change notification; or
suspend the SC-MRB corresponding to the SC-MTCH before paging listening.

17. A non-transitory computer readable storage medium storing program instructions, which, when executed by a processor, cause the processor to perform operations comprising:
in a process of reception of service data of a single cell-multimedia broadcast multicast service traffic channel (SC-MTCH) by a terminal device, determining, by the terminal device, that the terminal device is to receive a first type of data;
suspending, by the terminal device, a single cell-multimedia broadcast multicast service point to multipoint radio bearer (SC-MRB) corresponding to the SC-MTCH, wherein suspending the SC-MRB corresponding to the SC-MTCH further comprises reserving a radio link control (RLC) entity corresponding to the SC-MRB, and releasing one of a media access control (MAC) layer configuration or a physical layer configuration corresponding to the SC-MRB; and in response to determining that reception of the first type of data is completed, restoring or releasing the SC-MRB based on one of a temporary mobile group identity (TMGI) or a session identity corresponding to the SC-MRB.

18. The non-transitory computer readable storage medium according to claim 17, the operations further comprising:
wherein restoring the SC-MRB based on one of the TMGI or the session identity corresponding to the SC-MRB comprises:
when the reception of the service data of the SC-MTCH is not completed, restoring the SC-MRB based on one of the TMGI or the session identity corresponding to the SC-MRB; and
wherein releasing the SC-MRB based on one of the TMGI or the session identity corresponding to the SC-MRB comprises:
when the reception of the service data of the SC-MTCH is completed, releasing the SC-MRB based on one of the TMGI or the session identity corresponding to the SC-MRB.

* * * * *